(12) United States Patent
Schumann-Olsen

(10) Patent No.: US 7,852,881 B2
(45) Date of Patent: Dec. 14, 2010

(54) INVERSE MULTIPLEXER WITH TDM BONDING

(75) Inventor: Reidar Schumann-Olsen, Lier (NO)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 655 days.

(21) Appl. No.: 10/595,099

(22) PCT Filed: Aug. 27, 2003

(86) PCT No.: PCT/NO03/00298

§ 371 (c)(1), (2), (4) Date: Aug. 11, 2008

(87) PCT Pub. No.: WO2005/022837

PCT Pub. Date: Mar. 10, 2005

(65) Prior Publication Data

US 2008/0298396 A1    Dec. 4, 2008

(51) Int. Cl.
H04J 3/06    (2006.01)
H04J 3/04    (2006.01)

(52) U.S. Cl. .................... 370/509; 370/535
(58) Field of Classification Search ............... 370/509, 370/535
See application file for complete search history.

(56) References Cited

U.S. PATENT DOCUMENTS

| | | | |
|---|---|---|---|
| 5,515,371 A | 5/1996 | Venters | |
| 6,381,243 B1 * | 4/2002 | Ekstedt | 370/395.62 |
| 6,717,960 B1 * | 4/2004 | Anesko et al. | 370/536 |
| 6,788,686 B1 * | 9/2004 | Khotimsky et al. | 370/394 |
| 6,928,056 B2 * | 8/2005 | Evans | 370/244 |
| 7,075,952 B1 * | 7/2006 | Torma et al. | 370/538 |
| 7,145,908 B1 * | 12/2006 | Anesko et al. | 370/395.1 |
| 7,558,272 B2 * | 7/2009 | Meir | 370/395.43 |
| 7,623,541 B2 * | 11/2009 | Stiegler et al. | 370/443 |
| 7,636,358 B1 * | 12/2009 | Manchester et al. | 370/394 |

(Continued)

FOREIGN PATENT DOCUMENTS

WO    WO 98 08355 A    2/1998

OTHER PUBLICATIONS

Symmetricom, White Paper, "Extending the Reach and Rate of Symmetric DSL Service", ,URL:http:www.symmetricom.com.media/pdf/app-noted/wp-extending-dsl.pdf>, 2004.

(Continued)

Primary Examiner—Andrew Lee
(74) Attorney, Agent, or Firm—Roger S. Burleigh

(57) ABSTRACT

The present invention discloses one or more network components within a telecommunication network wherein said network is a serial bitstream network and the network components are comprising one or more inverse multiplexers, wherein said multiplexer(s) is/are TDM bonding multiplexers and said multiplexer(s) utilize(s) spare bits and/or FAS bits in a protocol for control of specific functions of the inverse multiplexer(s). The invention further includes a method for inverse multiplexing of one or more serial bitstreams within a telecommunication network wherein said method uses spare bit and/or frame alignment signals from a protocol to: measure differential delay between transmission lines at the receiving end, and/or secure timeslot integrity by compensation for individual link delay, and/or secure correct transmitter and receiver timeslot sequence by link identification, and/or monitor channel availability by block error checking.

12 Claims, 7 Drawing Sheets

U.S. PATENT DOCUMENTS

2002/0122435 A1* 9/2002 Mundkur et al. ............ 370/503
2002/0122439 A1* 9/2002 Evans ........................ 370/535
2002/0181458 A1* 12/2002 Amidan et al. .............. 370/389
2003/0123476 A1 7/2003 Shenoi
2003/0219019 A1* 11/2003 Wilson .................... 370/395.1

OTHER PUBLICATIONS

European Patent Office, International Search Report for PCT/NO03/00298, dated Feb. 18, 2004.

* cited by examiner

Fig. 3 – Basic frame

INVERSE MULTIPLEXER WITH TDM BONDING

FIELD OF THE INVENTION

The invention relates to inverse multiplexing within telecommunication, and in particular to inverse multiplexing with TDM Bonding.

BACKGROUND OF THE INVENTION

For digital transmission with bit rates not available on standards like E1/E2/E3 and T1/T2/T3 a flexible bandwidth can be provided with inverse multiplexing. The aggregate bitstream is split in a cyclic manner into several transmission links (E1/T1) and recombined in the remote end. In cable transmission systems the transmission range will be dependent on line bit rate, as seen with SHDSL, hence an increased transmission range will be possible by inverse multiplexing over multiple lines with lower bit rates. The increased range will reduce the complexity between two inverse multiplexers within the network because of the reduced number of repeaters necessary, further, less complexity/components means less service and maintenance, and hence an increased reliability.

KNOWN SOLUTIONS

A known solution is inverse multiplexing with ATM bonding. The ATM inverse multiplexing involves multiplexing and demultiplexing of ATM cells in a cyclic fashion among multiple links to form a higher bandwidth. FIG. 1 shows ATM inverse multiplexing.

ATM inverse multiplexing has its basis in ATM networks where each ATM cell has a length of 53 byte with 5-byte header and 48 byte payload. For TDM networks use, the TDM bitstream has to be circuit emulated into an ATM cellstream by ATM circuit emulation. FIG. 2 shows an ATM inverse multiplexer with circuit emulation.

The serial bitstream is segmented into ATM cells. However, in ATM with circuit emulation (AAL-1) there is a need of 1 extra byte, Sequence Number field (SN) and Sequence Number Protection (SNP), hence ATM CE-cells have the length of 53-bytes including 47 bytes payload and 6 bytes overhead. Filling up the ATM payload with bits from the serial bitstream creates delay. On lower bit rates this delay can be prohibitive. The efficiency ratio for Circuit emulation is poor with an overhead of approximately 12.5%.

To meet the requirements of low transmission delay, a minimized overhead, an increased working range, a reduced number of repeaters, reduced service and maintenance, an increased reliability and robustness, as well as higher availability for the transmission systems, a new and inventive mechanism of inverse multiplexing using TDM bonding is disclosed. Compared to the complexity of ATM the invention has among others the following characteristics:

Low transmission delay
Secure timeslot integrity by compensation for individual link delay
Secure correct transmitter and receiver timeslot sequence by link identification
Monitor channel availability by block error checking (CRC)
By monitoring CRC and RAi E-bit dynamically. Adapt transmission rate to available bandwidth. This will ensure that transmission lines can be disconnected in a controllable fashion, thus avoiding loosing all the bandwidth but only a fraction, where the fraction is the number of disconnected transmissions lines divided by the total number of transmission lines.

These and other features will be met by the present invention.

SUMMARY OF THE INVENTION

It is an object of the present invention to provide a method and a system avoiding the above described problems.

The features defined in the independent claims enclosed characterize this method.

In particular, the present invention provides a method and a system within inverse multiplexing, said system comprises one or more network components within a telecommunication network, wherein said network is a serial bitstream network and the network component(s) is/are comprising one or more inverse multiplexers wherein said multiplexer(s) are/is TDM bonding multiplexers. Said method describes a method for inverse multiplexing of one or more serial bitstreams within a telecommunication network wherein said method uses spare bit and/or frame alignment signals from a protocol to:

measure differential delay between transmission lines at the receiving end, and/or secure timeslot integrity by compensation for individual link delay, and/or secure correct transmitter and receiver timeslot sequence by link identification, and/or monitor both end of the channel for availability by block error checking and local and remote alarm indications.

BRIEF DESCRIPTION OF THE DRAWINGS

In order to make the invention more readily understandable, the discussion that follows will refer to the accompanying drawing.

DETAILED DESCRIPTION OF THE INVENTION

The present invention discloses an arrangement and a method for the use of said arrangement, where the arrangement's main feature is its versatility and flexibility within inverse multiplexing and particularly within inverse multiplexing with TDM bonding. In the following a detailed description of the present invention with support in the accompanying drawings is given.

FAS with Basic frame is in accordance with ITU rec. G.704. The Basic frame can be used as a "building block" in a hierarchical system where several basic frames can constitute of parts in a multiframe; a multiframing of 8×2 basic frames is also in line with the G.704. The spare bits in the multiframe are used for the control of the specific functions of the inverse multiplexer in accordance with the present invention. Table 1 shows the structure of the G.704 basic frame.

TABLE 1

Structure of the G.704 basic frame (Ts0).

|  | Bit number | | | | | | | |
|---|---|---|---|---|---|---|---|---|
| Alternate frames | 1 | 2 | 3 | 4 | 5 | 6 | 7 | 8 |
| Frame containing the frame alignment signal | 1 | 0 | 0 | 1 | 1 | 0 | 1 | 1 |
|  |  |  | Frame alignment signal | | | | | |
| Frame not containing the frame alignment signal | 1 | 1 | A | $S_{a4}$ | $S_{a5}$ | $S_{a6}$ | $S_{a7}$ | $S_{a8}$ |

It is bit number 2 in the table, that decides whether it is a frame alignment signal or not. If this bit is set to 0 (zero) we will have a frame alignment signal.

Figure 1:
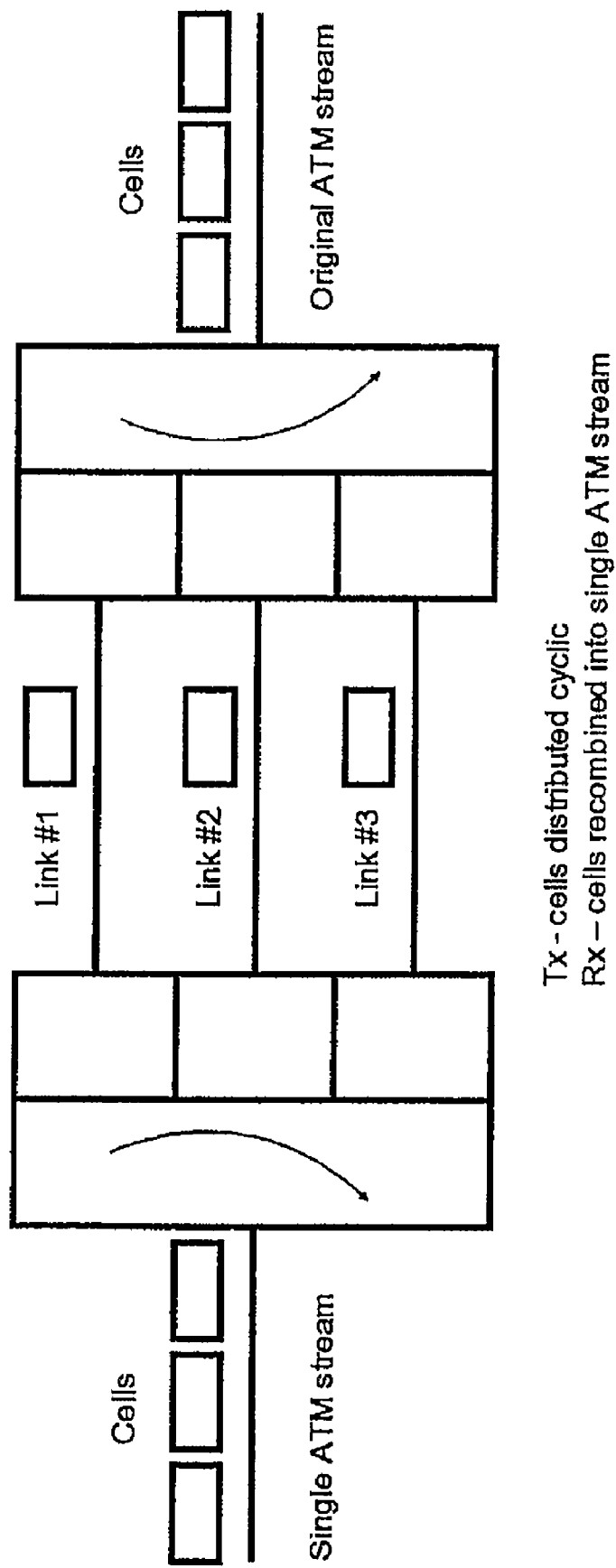
FIG. 1 shows ATM inverse multiplexing as known from the prior art.
Figure 2:
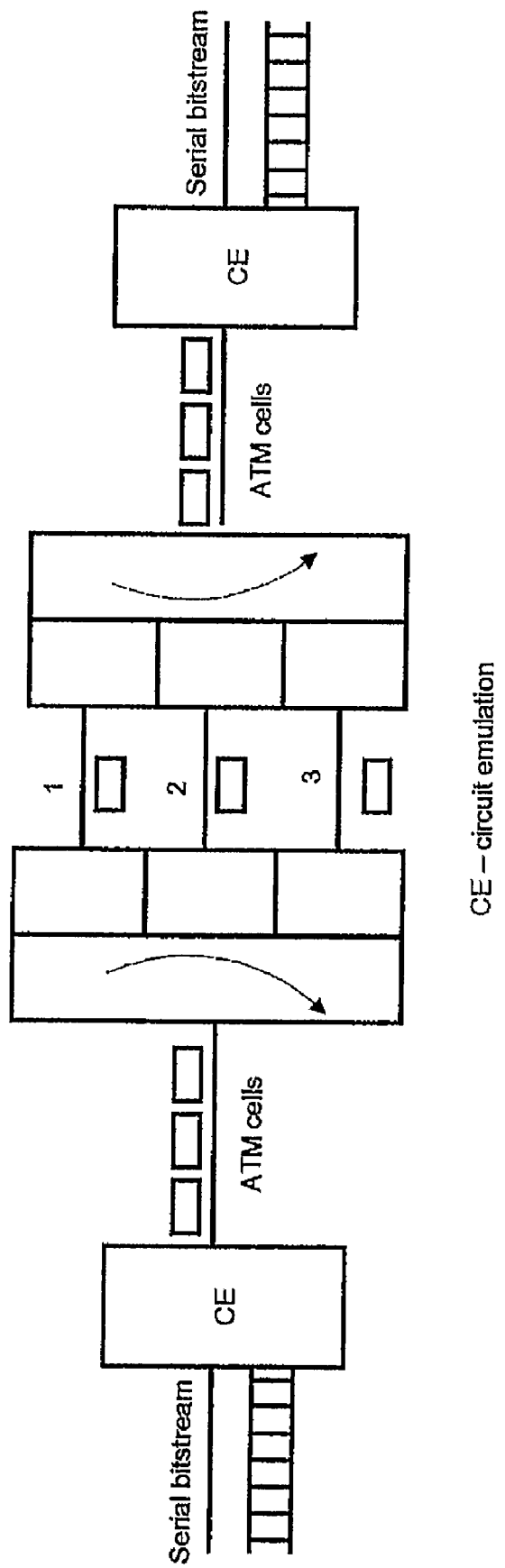
FIG. 2 shows an ATM inverse multiplexer with circuit emulation as known from the prior art.
Figure 3:
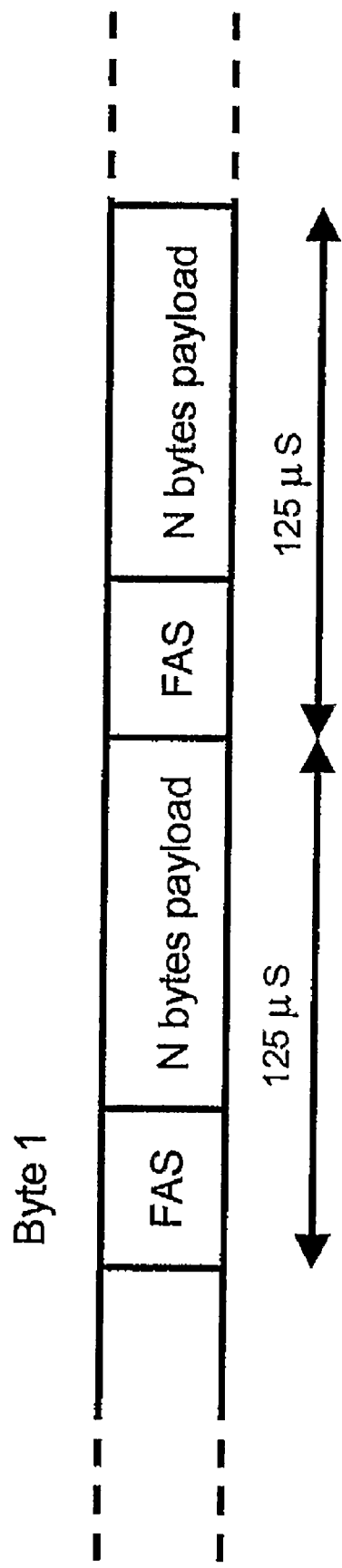
FIG. 3 shows a basic frame.

A basic frame is always 125 μs (FIG. 3), and the length of the payload will be decided by the bit rate, thus the higher the bit rate the bigger the payload.

TABLE 2 shows the G.704 multiframing.

| Sub-Multiframe (SMF) | Frame number | Bits 1 to 8 of the frame | | | | | | | |
|---|---|---|---|---|---|---|---|---|---|
|  |  | 1 | 2 | 3 | 4 | 5 | 6 | 7 | 8 |
| Multi-frame I | 0 | $C_1$ | 0 | 0 | 1 | 1 | 0 | 1 | 1 |
|  | 1 | 0 | 1 | A | $S_{a4}$ | $S_{a5}$ | $S_{a6}$ | $S_{a7}$ | $S_{a8}$ |
|  | 2 | $C_2$ | 0 | 0 | 1 | 1 | 0 | 1 | 1 |
|  | 3 | 0 | 1 | A | $S_{a4}$ | $S_{a5}$ | $S_{a6}$ | $S_{a7}$ | $S_{a8}$ |
|  | 4 | $C_3$ | 0 | 0 | 1 | 1 | 0 | 1 | 1 |
|  | 5 | 1 | 1 | A | $S_{a4}$ | $S_{a5}$ | $S_{a6}$ | $S_{a7}$ | $S_{a8}$ |
|  | 6 | $C_4$ | 0 | 0 | 1 | 1 | 0 | 1 | 1 |
|  | 7 | 0 | 1 | A | $S_{a4}$ | $S_{a5}$ | $S_{a6}$ | $S_{a7}$ | $S_{a8}$ |
| II | 8 | $C_1$ | 0 | 0 | 1 | 1 | 0 | 1 | 1 |
|  | 9 | 1 | 1 | A | $S_{a4}$ | $S_{a5}$ | $S_{a6}$ | $S_{a7}$ | $S_{a8}$ |
|  | 10 | $C_2$ | 0 | 0 | 1 | 1 | 0 | 1 | 1 |
|  | 11 | 1 | 1 | A | $S_{a4}$ | $S_{a5}$ | $S_{a6}$ | $S_{a7}$ | $S_{a8}$ |
|  | 12 | $C_3$ | 0 | 0 | 1 | 1 | 0 | 1 | 1 |
|  | 13 | E | 1 | A | $S_{a4}$ | $S_{a5}$ | $S_{a6}$ | $S_{a7}$ | $S_{a8}$ |
|  | 14 | $C_4$ | 0 | 0 | 1 | 1 | 0 | 1 | 1 |
|  | 15 | E | 1 | A | $S_{a4}$ | $S_{a5}$ | $S_{a6}$ | $S_{a7}$ | $S_{a8}$ |

Figure 4:
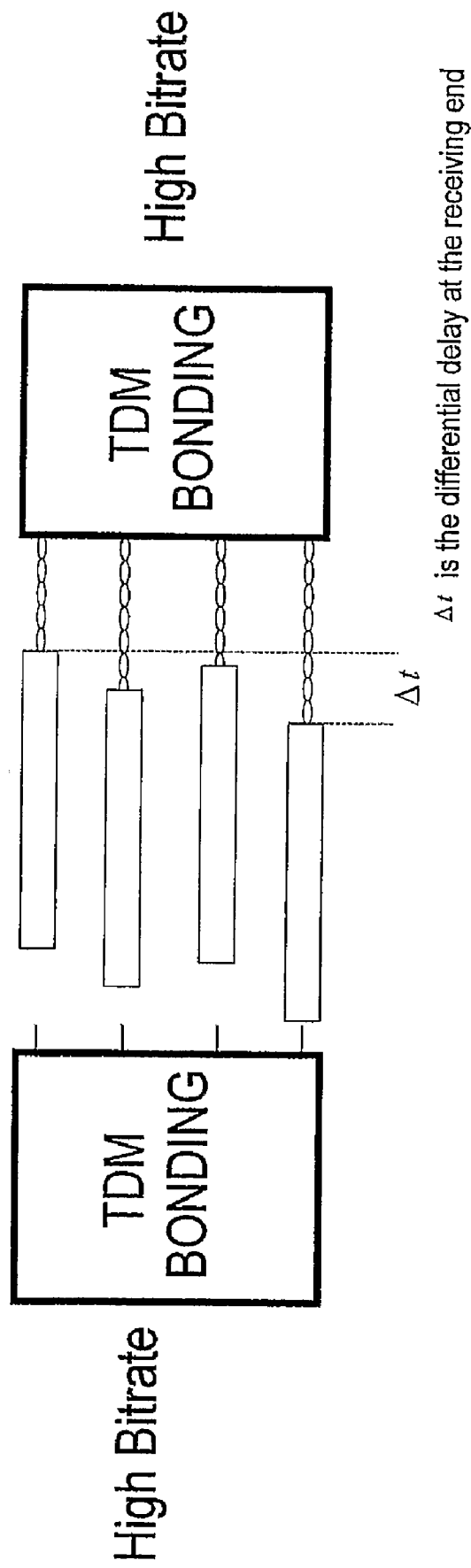
FIG. 4 shows the differential delay between transmission lines at the receiving end.

Applying a number of transmission lines between nodes will result in a differential delay between the lines as indicated in FIG. 4. The FAS-multiframe gives the reference for measurement of differential delay between transmission lines in the receiving end. In table 2, bit column 1 is the time compensation bit for multiframes, hence maximum differential delay is the length of the multiframe which equals to 2 mS. The FAS can either run in Basic frame or multiframing. In Basic frame the maximum delay is 125 μs. Link capacity adjustment can be done by the use of the CRC-4, E-bit and A-bit for the monitoring of channel availability.

The Sa bit can be utilized as line identification bit to compensate for pair crossing; this is of particular interest where cable systems having short time delay is used. The principle will work for up to 32 lines, in that it is 5 Sa bits available, if pair crossing is detected, this will be compensated for at the receiving end.

Figure 5:
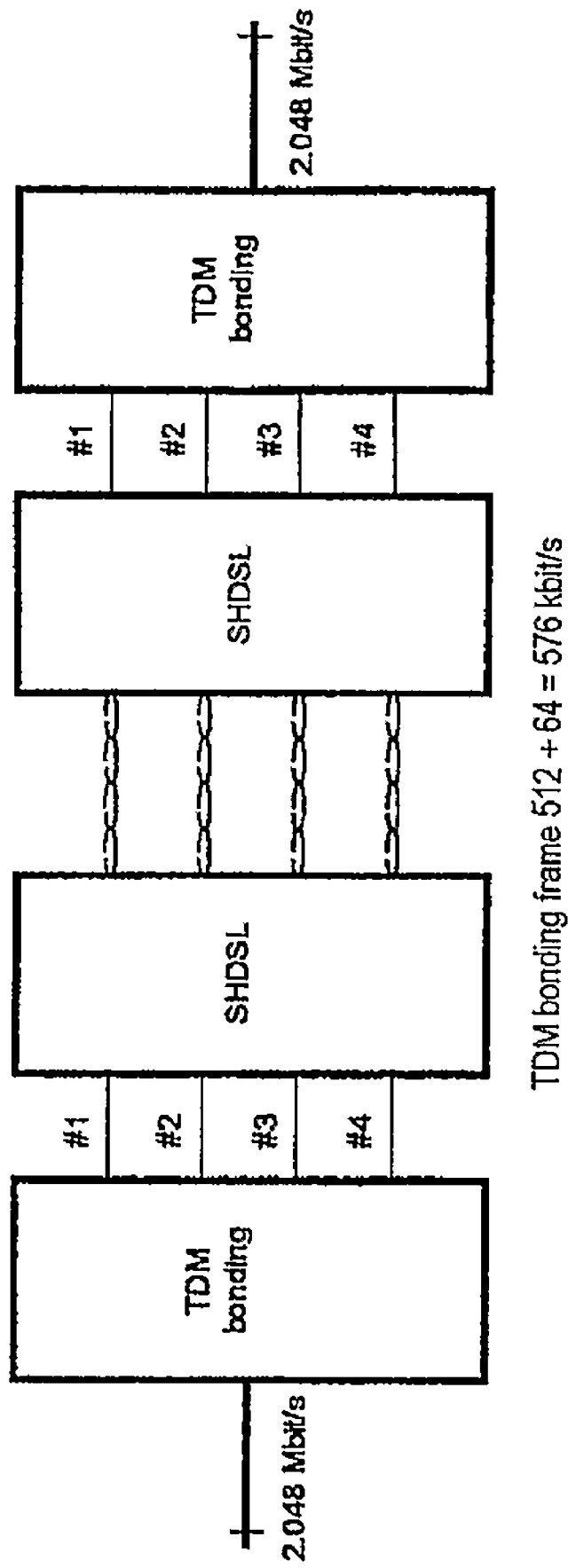
FIG. 5 shows TDM bonding of a 2.048 Mbit/s bitstream on 4 cable pairs with SHDSL transmission according to a first embodiment of the present invention, transporting 512 kbyte payload on each pair.
Figure 6:
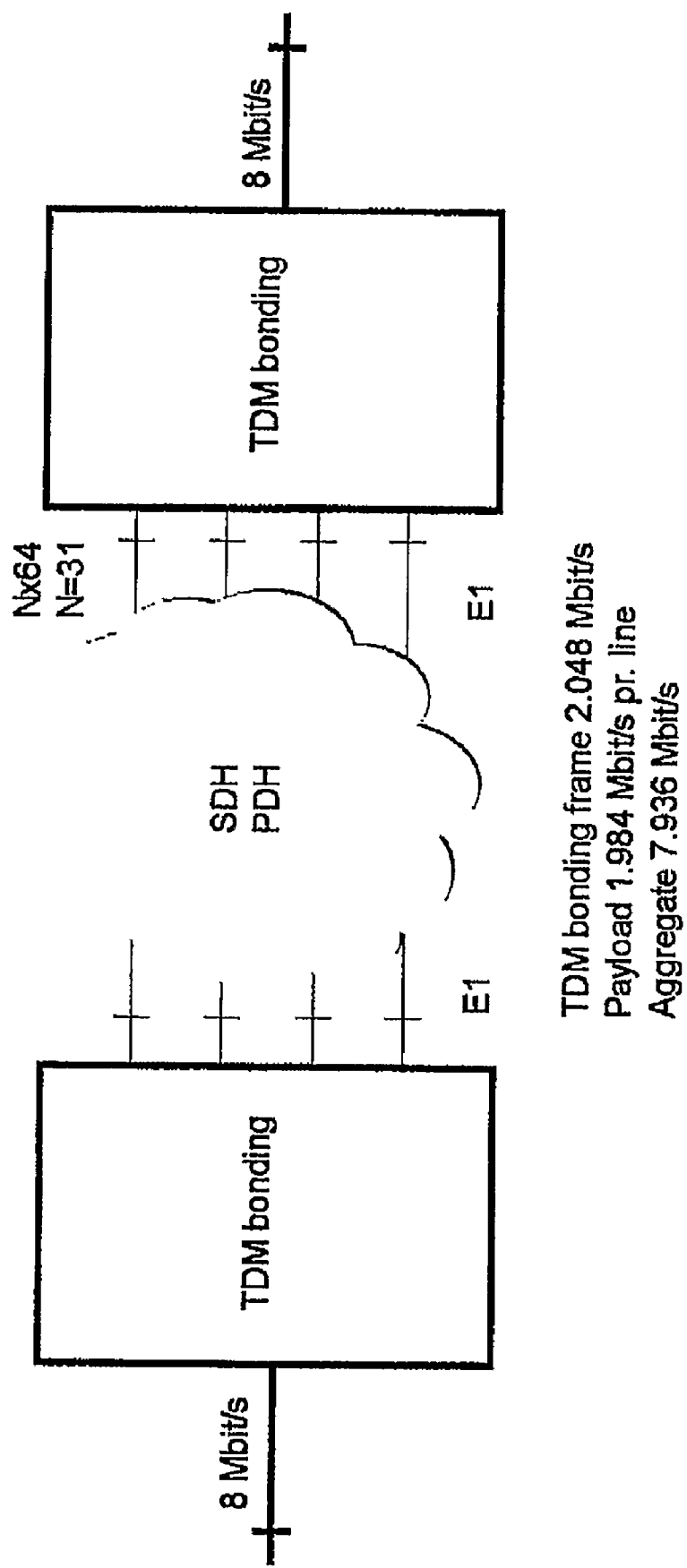
FIG. 6 shows the transport of 8 Mbit/s on 4 E1 lines through a SDH or PDH network according to a second embodiment of the present invention.
Figure 7:
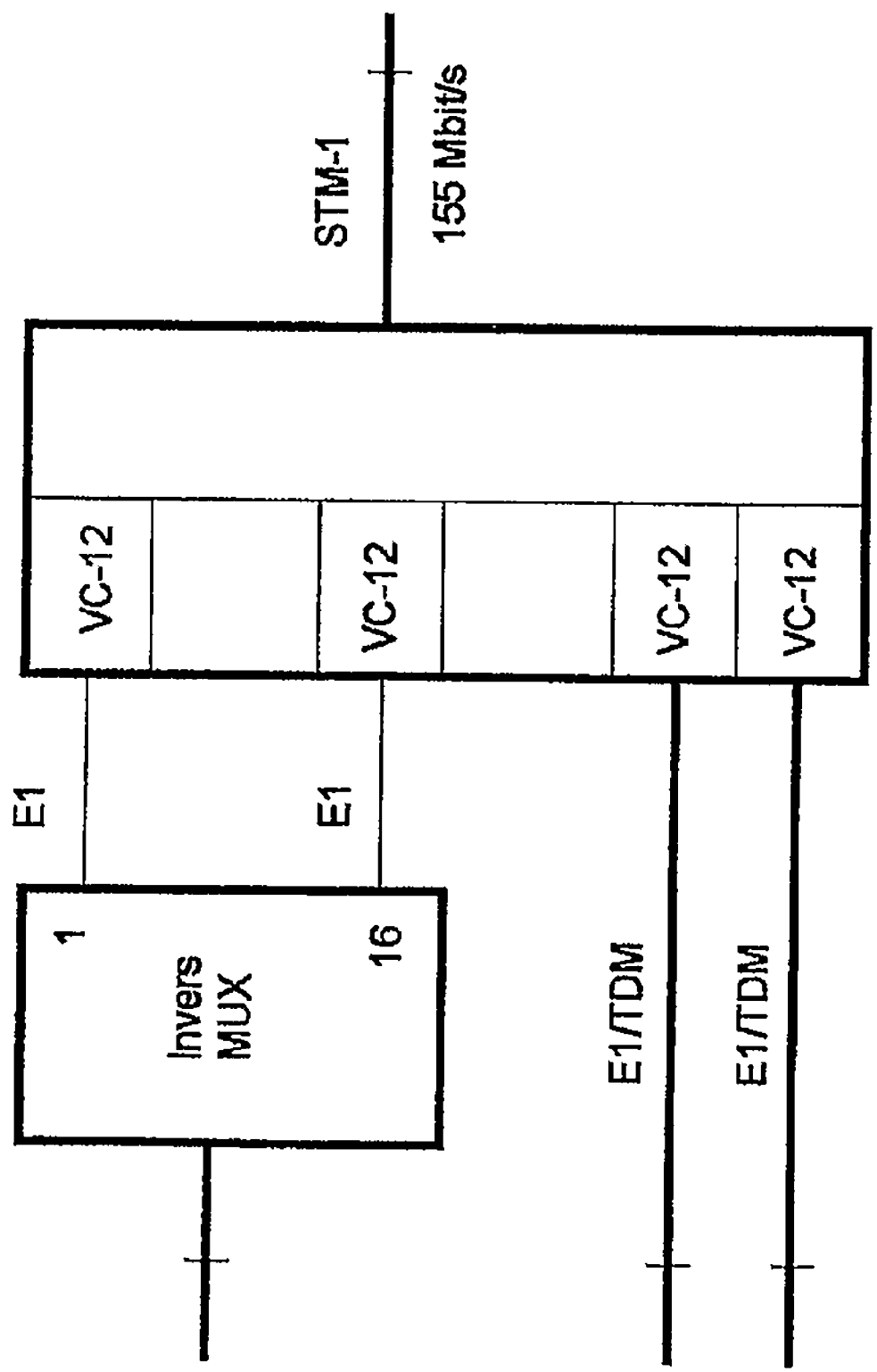
FIG. 7 shows a typical practical use of the inverse multiplexer in an SDH access multiplexer for mixed service with TDM and IP/ATM according to a third embodiment of the present invention.

Alternatively, the spare bit can be used for sequence numbering forming a multi-multiframe pattern of up to 32 multi-frames. A delay compensation of 32×2 mS=64 mS can be achieved. The length of the payload is variable from N=1 and upwards, depending on bit rate, in that a basic frame is 125 μs, if standards are applied, E1 . . . . T1 . . . , the payload will increase step by step depending on the bit rate adapted to these standards. In FIGS. 5, 6 and 7 examples of the use of the inverse multiplexer are shown.

The shown c bits in table 2 indicate the checksum.

For the TDM inverse multiplexer, the transmission overhead is limited to 3% compared to the ATM with 12.5%. Transmission delay is kept at a minimum as there are no cells to be filled up. For ATM based inverse multiplexer, the aggregate will be reduced to less than 7.264 Mbit/s.

A First Preferred Embodiment of the Invention

With reference to FIG. 5, TDM bonding of a 2.048 Mbit/s bitstream (E1) on 4 cable pairs with SHDSL transmission is shown. Employing the traditional solution for this scenario would mean a reduced node to node range; hence there would have been an increased need of repeaters, compared with the first preferred embodiment of the present invention. A reduced bit rate employing 4 lines will increase the working range and thus decrease the need of repeaters. Less repeaters means less service and maintenance, as well as increased quality. Employing the solution with ATM inverse multiplexer with circuit emulation, will, as earlier described, increase the complexity as well as introducing unnecessary transmission delay given that each cell of 47 bytes has to be filled up with traffic, before transmitted.

The solution shown in FIG. 5, on the contrary, gives an effective utilization of the network capacity.

As shown in the figure, one or more 2.048 Mbit/s TDM bitstreams are transported between two or more nodes, employing the present invention. The bitstream(s) is/are bonded in the block assigned TDM bonding according to the methods depicted in table 1 and 2 and the accompanying text. After the bonding process we will have four lines each with a payload of 512 kbit/s, derived from 2.048 Mbit/s/4=512 kbit/s, adding to the payload is the FAS of 64 kbit/s resulting in a bit transfer rate of 576 kbit/s per pair of cables and 8 byte payload and 1 byte overhead per frame. ATM inverse multiplexing would have given an overhead to payload ratio of 6/8.

A Second Preferred Embodiment of the Invention

With reference to FIG. 6 a second preferred embodiment of the present invention is shown. In this figure one or more 8 Mbit/s bitstreams are transported over a PDH or SDH network between two or more nodes/networks, employing the present invention. The TDM bonding of the original bitstream results in 4 E1 lines, where each of these lines has a bit transfer rate of 2.048 Mbit/s. Each basic frame has, FAS included, a length of 125 μs, thus the basic frame is of 32 bytes length, derived from the expression:

(2.048 Mbit/s*125 μs)/8.

The payload is of 31 bytes length, whereas the overhead is of 1 byte length per frame, resulting in a payload transfer rate per line of:

((32−1)*8) bit/125 μs=1.984 Mbit/s.

The overhead ratio is held at a minimum compared to what is the case in traditional solutions; it is given from (2.048−1.984) Mbit/s/1.984 Mbit/s~3%.

The aggregate payload bit transfer rate is

4*1.984 Mbit/s=7.936 and the transmission delay is kept at a minimum as there are no cells to be filled up. For ATM Based inverse multiplexer, the aggregate will be reduced to less than 7.264 Mbit/s.

As depicted in FIG. 6, the transmission between the two or more TDM bonding mux'es is over a SDH or PDH network. Within this network there can be several network components such as switches, repeaters etc., all of whom might add to the differential delay at the receiving end. Thus, the present invention's capability for delay compensation can be of uttermost importance.

A Third Preferred Embodiment of the Invention

In FIG. 7 a typical practical use of the inverse multiplexer in an SDH access multiplexer for mixed service with TDM and IP/ATM is shown.

The STM-1 multiplexer can be used for combined E1 TDM channels, mapped into VC-12 and for E1 channels forming a transparent high capacity data channel via the inverse multiplexer, also mapped into VC-12.

In FIG. 7, 16 E1 lines are forming a 32 Mbit/s transparent channel which can be used for packet transmission like IP or ATM.

The hybrid solution shown can be expanded to cover signal lines with bit transfer rates different from those shown in this and the previous examples, furthermore solutions employing other virtual containers may be applied, as well as E1/E2/E3 and T1/T2/T3 signals. Wherever the bonding technique described with support in table 1 and 2 is applicable, the present invention will be applicable.

The preferred embodiments above are meant to make the invention more readily understandable. However, wherever TDM signals are applied between a transmitter and a receiving end, and one wishes to reduce the bit rate between the transmitter and the receiver without reducing the overall bandwidth, as long as there are enough spare bits for ?-t handling, the present invention is applicable.

Note that while in the foregoing, a detailed description of particular embodiments of the present invention has been provided, it is to be understood that equivalents are to be included within the scope of the invention as claimed.

ABBREVIATIONS

AAL ATM Adaptation Layer. A collection of standardized protocols that provide services to higher layers by adapting user traffic to a cell format. The AAL is divided into the Convergence Sublayer (CS) and the Segmentation and Reassembly (SAR) sublayer.

AAL-1 ATM Adaptation Layer Type 1. Protocol standard used for the transport of Constant Bit Rate (CBR) traffic (for example, audio and video) and for emulating TDM-based circuits (for example, DS1, E1).

ATM Asynchronous Transfer Mode. A broadband switching and multiplexing, connection-oriented, high performance and cost-effective integrated technology for supporting B-ISDN services (i.e. multimedia). Since no clock control is necessary it is called asynchronous (see also STM). Information is transmitted at very high rates (up to hundreds of Mbps) in fixed-size packets called cells. Traffic streams are distinguished and supported according to different QoS classes.

CE Circuit emulation. A virtual-circuit (VC) service offered to end-users where the characteristics of an actual, digital bit-stream (for example, video traffic) line are emulated (for example, a 2 Mbps or 45 Mbps signal).

CRC Cyclic Redundancy Check. A bit error detection technique that employs a mathematical algorithm, which calculates on the basis of the transmitted bits, a value which it attached to the information bits in the same packet. The receiver, using the same algorithm, recalculates that value and compares it to the value received. If the two values do not agree the transmitted packet is then considered to be in error.

DS-1 Digital Signal 1. Physical Interface for digital transmission at the rate of 1,544 Mbps. Also known as T-1 standard, DS-1 can simultaneously support 24 DS-0 circuits.

E1 European Digital Signal 1. European standard for digital physical interface at 2.048 Mbps.

E2 European Digital Signal 2. Data signal that carries four multiplexed E-1 signals. Effective data rate is 8448 Mbps.

E3 European Digital Signal 3. European standard for digital physical interface at 34.368 Mbps. It can simultaneously support 16 E-1 circuits.

FAS Frame Alignment signal.

PDH Plesiochronous Digital Hierarchy. A hierarchy that refers to the DS-1, DS-1, DS-2 and DS-3 interfaces for digital transmission. Originally developed to efficiently carry digitized voice over twisted pair.

RAi Remote Alarm identification.

SDH Synchronous Digital Hierarchy. A hierarchy that designates signal interfaces for very high-speed digital transmission over optical fibre links.

SHDSL Single-pair high speed Digital Subscriber Line.

SN Sequence number. Part of the header of the SAR-PDU (2 bits in AAL1, 4 bits in AAL3/4). SN is used as a sequence counter for detecting lost, out-of-sequence or misinserted SAR-PDU's.

SNP Sequence Number Protection. A 4-bit field in the header of the AAL1 SAR-PDU. This field contains the CRC and the parity bit fields.

T1 A TDM digital channel carrier that operates at a rate of 1.544 Mbps. Known also as a repeater system, it is often referred as DS-1.

T2 The North American standard for DS-2 (Digital Signal Level 2). T-2 operates at a signaling rate of 6.312 Mbps, and has four times the capacity of T-1. It is generally used only in carrier backbone network.

T3 A TDM digital channel carrier that operates at 44.736 Mbps. It can multiplex 28 T1 signals. The term is often used to refer to DS-3.

TDM Time-Division Multiplexing. A technique for splitting the total bandwidth (link capacity) into several channels to allow bit streams to be combined (multiplexed). The bandwidth allocation is done by dividing the time axis into fixed-length slots; a particular channel can then transmit only during a specific time slot.

VC Virtual container. Definition: A VC is the information structure used to support path layer connections in the SDH. It consists of information payload, and path overhead (POH) information fields organized in a block frame structure which repeats every 125 or 500 microseconds. Alignment information to identify VC frame start is provided by the server network layer. Two types of VCs have been identified:
a) Lower order VC: VC-n (n=1, 2, 3); this element comprises a single C-n (n=1, 2, 3) plus the lower order VC POH appropriate to that level.
b) Higher order VC: VC-n (n=3, 4). This element comprises either a single C-n (n=3, 4) or an assembly of tributary unit groups (TUG-2s or TUG-3s), together with VC POH appropriate to that level.

VC-11 Virtual Container of SDH with 1544 kbit/s transmission rate.

VC-12 Virtual Container 12, the termination of a higher order VC for the purpose of adding, dropping, or cross-connecting any individual lower order VC or VC group. 2048 kbit/s.

The invention claimed is:

1. A method for bandwidth conservation and bit rate reduction between two nodes in a serial bitstream network comprising TDM bonding multiplexers at a transmitting and a receiving end, said method comprising the steps of:
   measuring differential delay between a number of transmission lines at the receiving end using FAS multiframe as reference for the measurement;
   using a time compensation bit in every basic frame constituting a Multiframe for adjustment of said differential delay between a plurality of transmission lines at the receiving end; and,
   using spare bits (Sa) as link identification bits to compensate for pair crossing, thereby securing correct transmitter and receiver timeslot sequence by said link identification.

2. The method according to claim 1, further comprising the step of monitoring channel availability using bits selected from the group consisting of: CRC-4, E-bit and A-bit.

3. The method according to claim 1, further comprising the step of calculating capacity of link identifications between transmitter and receiver identified by the spare bits using the expression $2^{Sa}$.

4. The method according to claim 1, further comprising the step of compensating for n×125 μs, where n is a number of basic frames using said means for measurement of differential delay between a number of transmission lines at the receiving end.

5. The method according to claim 1, wherein said method complies with ITU recommendation G.704.

6. The method according to claim 1, wherein said TDM bonding multiplexers perform inverse multiplexing.

7. A system for bandwidth conservation and bit rate reduction in a serial bitstream network, comprising:
   TDM bonding multiplexers at transmitting and receiving ends of said network;
   means for measuring differential delay between a number of transmission lines at the receiving end using FAS multiframe as reference for the measurement;
   means for using a time compensation bit in every basic frame constituting a multiframe for adjustment of said differential delay between a plurality of transmission lines at the receiving end; and,
   means for using spare bits (Sa) as link identification bits to compensate for pair crossing, thereby securing correct transmitter and receiver timeslot sequence by said link identification.

8. The system according to claim 7, further comprising means for monitoring channel availability using bits selected from the group consisting of: CRC-4, E-bit and A-bit.

9. The system according to claim 7, further comprising means for calculating capacity of link identifications between transmitter and receiver identified by the spare bits using the expression $2^{Sa}$.

10. The system according to claim 7, further comprising means for compensating for n×125 μs, where n is a number of basic frames using said means for measurement of differential delay between a number of transmission lines at the receiving end.

11. The system according to claim 7, wherein said system complies with ITU recommendation G.704.

12. The system according to claim 7, wherein said TDM bonding multiplexers perform inverse multiplexing.

* * * * *